Aug. 25, 1964 L. J. CLAPSADLE 3,145,515
MANUFACTURE OF MULTI-LAYER INSULATED STRUCTURE
Filed April 24, 1962 2 Sheets-Sheet 1

INVENTOR.
LEO J. CLAPSADLE
BY John C. LeFever
ATTORNEY

Aug. 25, 1964     L. J. CLAPSADLE     3,145,515
MANUFACTURE OF MULTI-LAYER INSULATED STRUCTURE
Filed April 24, 1962     2 Sheets-Sheet 2

INVENTOR.
LEO J. CLAPSADLE
BY John C. LeFever
ATTORNEY

United States Patent Office 3,145,515
Patented Aug. 25, 1964

3,145,515
MANUFACTURE OF MULTI-LAYER INSULATED
STRUCTURE
Leo J. Clapsadle, Croton-on-Hudson, N.Y., assignor to
Union Carbide Corporation, a corporation of New
York
Filed Apr. 24, 1962, Ser. No. 189,872
6 Claims. (Cl. 53—27)

This invention relates to the manufacture of multi-layer insulated structures, and more specifically to containers having an outer curved surface wrapped with alternate layers of thin, flexible reflecting shields and elastically compressible fibrous web material.

Double-walled containers are being increasingly used for the storage of low-boiling liquefied gases such as liquid oxygen and the like. Such containers comprise an inner liquid-storage vessel and an outer casing with an annular insulating space therebetween. This space is preferably filled with insulating material and maintained under a vacuum pressure so as to minimize the atmospheric heat inleak and resulting loss of evaporated liquid. A particularly effective insulation is that described and claimed in U.S. Patent No. 3,009,601, issued November 21, 1961 to L. C. Matsch, one embodiment consisting of alternating layers of a thin flexible metal foil such as aluminum, and an elastically compressible fibrous web of low conductive material such as glass fiber, which are conformably wrapped around a container. The disclosure of the aforementioned patent is incorporated herein to the extent pertinent. Another widely employed low conductive material is permanently precompacted paper composed of unbonded fibers, as more fully described and claimed in U.S. Patent No. 3,009,600, also issued November 21, 1961 to L. C. Matsch.

Insulation webs, as contrasted to precompacted papers, are loosely formed, fluffy, are somewhat thicker than papers, and have virtually no tensile strength. Alternate-layer insulations employing webs are usually provided by the steps of (1) blowing finely divided glass fibers onto a porous back-up conveyor belt or moving screen, and (2) transferring this mat or web of fibers to an inexpensive back-up sheet material such as paper for subsequent handling. The backing or back-up sheet is necessary to prevent the loose web from falling apart and to permit successful handling. The back-up sheet also serves to separate the adjacent insulation layers and prevent them becoming interlaced when the insulation is (3) wound into a convenient size roll for storage and/or shipment. Further steps usually followed in the use of webs as a component in alternate-layer insulation are (4) rewinding the rolled insulation onto a vessel with the simultaneous step (5) of removal of the paper back-up or parting sheet and insertion of the desired reflective component.

Because the insulation webs are very fragile, steps 1, 2 and 3 are carried out in a very carefully controlled part of the overall process using special equipment and skilled workmen to avoid damage to the web. However, application steps 4 and 5 usually occur in customers' fabrication shops or under field conditions where web damage is much more likely to occur. Furthermore, the webs cannot safely withstand even the slight tension needed to pull the material off the supply roll during its transfer onto the vessel being insulated, and must be fed onto the vessel with some slack. The ability of the insulation to withstand at least some tension would be quite advantageous. It would often be feasible to substitute the radiation reflective sheet for the paper back-up sheet as a separate operation without damaging the resulting insulation material, if the web material possessed sufficient tensile strength. However, since this would involve a separate process step, such a procedure would be more expensive and hence undesirable.

An object of the present invention is to provide an improved method for manufacturing a structure comprising a container having an outer curved surface wrapped with alternate-layer type insulation.

Another object is to provide an improved method in which tension may be applied during wrapping without tearing the elastically compressible, low conductive web layer.

A further object is to provide an improved method in which the paper back-up sheet may be eliminated without eliminating its function.

Additional objects and advantages of this invention will be apparent from the ensuing disclosure and the appended claims.

According to the invention, the thin reflecting shield is substituted for the paper backing at the point of manufacture of this web, thereby completely eliminating step (5) of the prior art method. The fragile web material is not exposed to tension forces; the reflecting shield, e.g. foil material, withstands the tension needed to pull the composite alternate-layer insulation off the supply roll and feed it onto the vessel being insulated. In this manner the invention provides an improvement to the overall procedure of using the shield not only as the reflective component of the composite insulation, but also as the back-up sheet onto which the fibrous web is deposited during manufacture. This eliminates the necessity of using for the back-up sheet, another disposable material such as paper which is undesirable in the final composite insulation and must be discarded.

More specifically, this invention in one embodiment contemplates a method for manufacturing a structure comprising a container having an outer curved surface wrapped with alternate-layers of thin reflecting shields and elastically compressible fibrous web material. The method comprises the steps of: (1) forming an insulation composite of a thin reflecting shield backing sheet and elastically compressible web material at least coextensive with and superimposed on the shield, (2) winding the insulation composite into a roll, (3) providing the container having an outer curved surface and wrapping such container with the insulation composite by simultaneously unwinding the roll, tensioning the reflecting shield backing sheet, and applying the insulation composite on the curved surface of the container.

Figure 1:
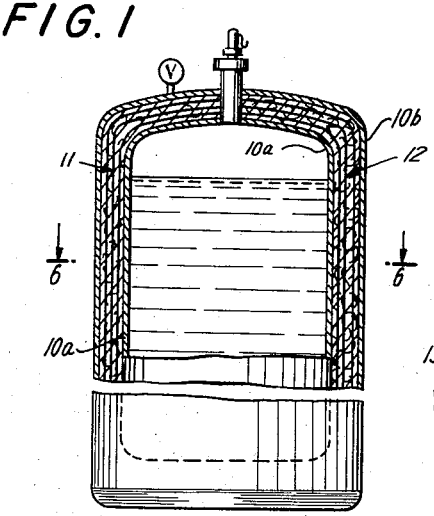
FIG. 1 is a front elevational view partly in section, of a double-walled liquefied gas container constructed in accordance with the method of the invention.
Figure 2:
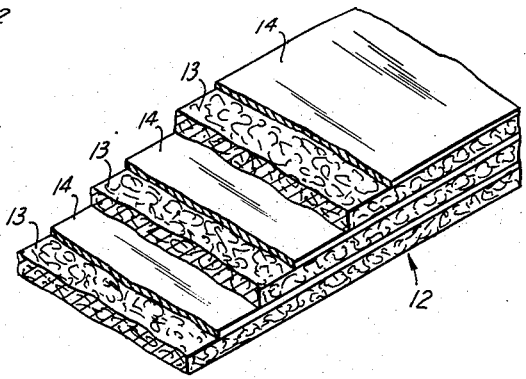
FIG. 2 is an isometric view of the composite insulating material shown in a flattened position with parts broken away to expose underlying-layers.

Shown in FIG. 1 is a double walled heat insulating container manufactured according to the present invention, having parallel inner vessel and outer casing walls 10a and 10b and an evacuated insulating space 11 therebetween. Disposed within the insulation space 11 is an insulation composite 12 comprising essentially a low heat conductive fibrous web material 13 arranged in alternate-layers with thin, reflecting shield backing sheets 14 in contiguous relation for diminishing the transfer of heat by radiation across the insulating space 11 (see FIG. 2). The insulation appears as a series of spaced reflectors 14 disposed substantially transversely to the direction of heat flow. The low conductive web material 13 uniformly contacts the surface of each radiation shield in super-imposed relation. No other supports are required to maintain the insulation in operative assembled relation.

The thin reflecting shield backing sheets 14 may comprise either a metal such as aluminum or copper, or a metal coated material such as aluminum coated plastic film. Radiation reflective materials such as aluminum in the form of thin metallic foils are preferred in the practice of the present invention. A principal requirement is that the thin reflecting shield have sufficient tensile strength to carry the low conductive fibrous web and preferably permit adequate tensioning during the insulation wrapping step to drive the insulation composite supply roll. Also, it is often desirable to provide additional tension to the insulation during application on the container curved surface to control the number of insulation layers applied and/or to help retain the insulation in place during subsequent handling of the container. On the other hand, thinness in the reflecting shield is beneficial because it facilitates folding and forming the insulation composite to fit the contour of the container curved surface. It also minimizes the weight of the insulated container. In cryogenic vessels, low density is additionally important because it reduces the time and the quantity of expensive refrigeration needed to cool down the inner vessel and establish a stable temperature gradient through the insulation. Low density insulation also permits carrying additional product for transport containers having a maximum weight limitation.

Radiation reflecting shields of less than about 0.2 mm. thickness are suitable for the practice of this invention and when foils are employed, thicknesses of less than 0.02 mm. are preferred. A particularly suitable reflective shield is ¼ mil. (0.00025 in. or 0.0062 mm. thick) plain, annealed, aluminum foil without lacquer or other coating. Also, any film of oil resulting from the rolling operation should be removed as by washing. Other radiation reflective materials which are susceptible of use in the practice of the invention are tin, silver, gold, copper, cadmium or other metals. The emissivity of the reflective shield material should be between about 0.005 and 0.2, and preferably between 0.015 and 0.06. Emissivities of 0.015 to 0.06 (98.5% to 94.2% reflectivity) are obtainable with aluminum and are preferred in the practice of this invention, while with more expensive materials such as polished silver, copper and gold, emissivities as low as 0.005 may be obtained.

The base or separating material of the insulation is a low heat conductive fibrous material provided in an uncompacted, elastically compressible, resilient and fluffy state, preferably in the form of sheets. The physical properties of this material, known as "webs" to those skilled in the art, must be closely controlled to obtain the highly efficient composite insulating material of the present invention. It has been found that compressible sheets of very fine, low conductive fibers which are matted but unbonded together are satisfactory.

Suitable fibers include clean glass filaments having diameters between about 0.2 and 10 microns, with the web material having an average weight of about 1 to 10 grams per sq. ft. Apparent thickness of one web alone is usually about 0.050 to 0.250 inch. The fibers are preferably substantially randomly disposed within the plane in the installed condition, and the individual fibers are also preferably oriented in a direction substantially perpendicular to the flow of heat. It will be understood that as a practical matter, the fibers will not be individually confined to a single plane, but rather in a finite thickness of fibrous material. The fibers will be generally disposed in thin parallel strata with, of course, some indiscriminate cross weaving of fibers between adjacent strata. Compressible fibers having diameters in the range of 0.75 to 1.5 microns such as those commercially designated as Type 108 or "AA" fibers, and fibers designated as Type 112 or "B" fiber having diameters in the range of 2.5 to 3.8 microns are normally prepared as webs, and are suitable for practicing this invention. A preferred web material is commercially designated as Type 110 or "A" fiber, and has individual fiber diameters of 1.6 to 2.6 microns.

It has been found that the present invention permits the use of lighter weight webs than heretofore employed. This is important for it permits insulation composites having many reflective shields per inch, but having low bulk density. Forming the insulation composite with a reflective shield backing sheet virtually eliminates the possibility of handling damage. This may occur, e.g. from excessive tensioning, when the web is transferred from the conventional paper backing sheet to the reflective shield. The advantages of employing web Type 110–A as the low conductive component of an insulation composite by virtue of the present invention, as compared with the larger diameter web Type 112–B are illustrated in the following table of observed data.

*Table I*

| Type of Web | Average Fiber Dia. (microns) | Average Web Wgt. (gms./ft.²) | Optimum Layers per Inch | Optimum Density, Lb./Ft.³ | $K_a$[1] Thermal Conductivity, B.t.u./hr. ft. ° F. |
|---|---|---|---|---|---|
| 112–B | 2.6–3.8 | 4.75 | 13 | 2.1 | 0.12×10⁻³ |
| 110–A | 1.6–2.6 | 2.50 | 11 | 1.2 | 0.10×10⁻³ |

[1] For boundary temperatures of 530° R. and 162° R. and a vacuum less than 0.1 microns of mercury.

Figure 3:
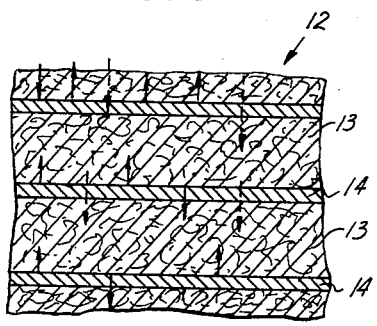
FIG. 3 is a greatly enlarged detail section view showing the irregular path of heat transfer through the composite alternate-layer insulation.

The sequence of modes of heat transfer which might occur in a typical multi-layer insulation of aluminum foils which are proximately spaced from each other by layers of glass fiber mats or webs having a fiber orientation substantially parallel to the aluminum foils and transverse to the direction of heat flow, might be as follows:

Referring to FIG. 3, radiant heat striking the first sheet of aluminum foil will for the most part be reflected, and the remaining part absorbed. Part of this absorbed radiation will tend to travel toward the next barrier by re-radiation, where again it will be mostly reflected, part will travel by solid conduction, and a minor part by conduction through the residual gas. According to the solid conduction method of heat transfer, the heat leak proceeds along the fiber webs in what might be considered an irregular path, crossing relatively small areas of point contact between crossing fibers until it reaches the second sheet of aluminum foil, where the heat reflecting and absorbing process described above is repeated. Because of the particular orientation of the individual fibers in the webs, the path of solid conduction from the first sheet of aluminum foil to the second is greatly lengthened, and encompasses an indefinitely large number of point contact resistances between contacting fibers. By analogy it will be seen that a multi-layer insulation having a series of heat reflecting sheets and a compressible fiber oriented web layer of low conductive insulating material therebetween may be particularly efficient in preventing or diminishing heat losses by radiation as well as by conduction.

In the practice of the present invention, the radiation shield spacing may be between about 4 per inch using relatively thick webs for separation, and about 50 shields per inch using very thin webs having only a few fibers per unit area of the low conductive layer. A preferred range is between 6 and 30 shields per inch. These ranges represent preferred balances between the conductive and radiative modes of heat transfer. With a given compressible web, the thickness of the layers may be varied considerably by applying more or less compression on the layer material during installation.

Figure 4:
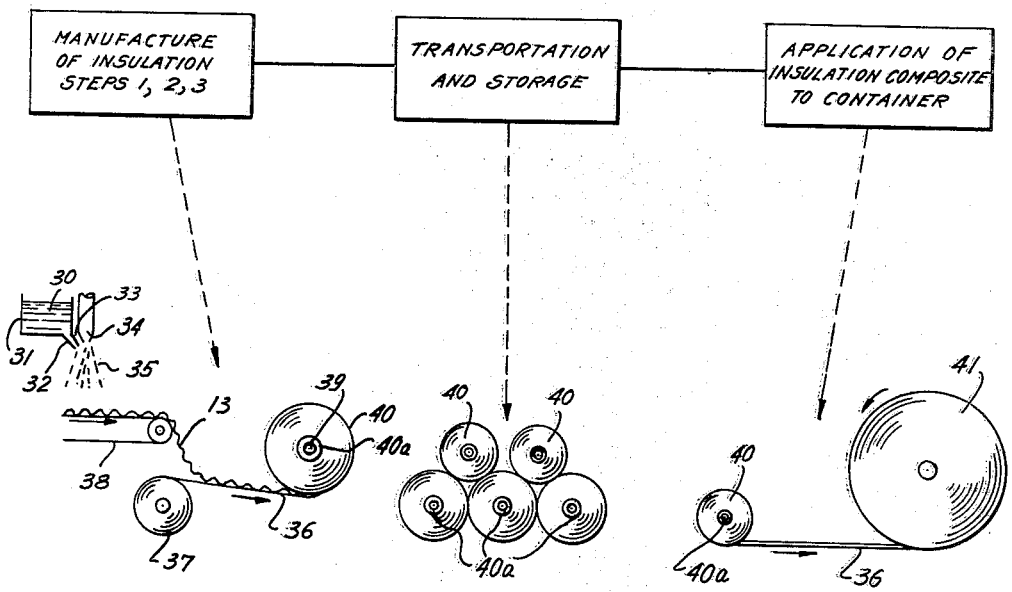
FIG. 4 is a schematic flowsheet of a method for manufacturing an alternate-layer insulated container, according to the present invention.

The overall method of the invention is illustrated in FIG. 4. As previously discussed, the low conductive webs may for example be produced by forming very fine fibers by blowing strands of molten glass with a jet of steam or hot air, and collecting these individual fibers at a desired rate on a moving porous belt, screen or wheel to form a mat or web of desired dimension and thickness. Suitable apparatus for forming mats in this manner is described in greater detail in U.S. Patent No. 2,897,874 issued August 4, 1959 to C. J. Stalego et al., the disclosure of which is incorporated herein to the extent pertinent.

Referring now to FIG. 4, molten glass or other fiber-forming material 30 is discharged from forehearth 31 through orifice 32 as a stream 33 for attenuation by and entrainment in adjacent hot gas stream 34 as long strands 35. The latter are cooled and deposited on moving conveyor or belt 38 and then transferred to reflective sheet 36 being unwound from supply roll 37 driven by a suitable power source (not shown) onto product roll 40. The rates of fiber strand deposition and radiation shield unrolling may be regulated in a manner well known to those skilled in the art to provide an insulation composite of desired specifications. The insulation composite is wound around power driven shaft 39 to form rolls 40 of desired size. The reflective backup sheet 36 provides a useful tensioning function during manufacture of the insulation composite onto the product roll 40. This tensioning is accomplished by winding the insulation composite onto rigid cylindrical cores 40a of relatively small diameter, such as 3 inches diameter, with the backing sheet 36 being fastened thereto by suitable means, such as an adhesive or by winding several preliminary turns of backing onto the core. Thus, a minimum amount of tension is placed on the insulation composite in the product roll 40 during manufacture to provide a reasonable bulk density for shipping and also to control the stability of the insulation on the roll. The diameter of rolls 40 will usually be limited by the tension which can be safely applied to the thin reflective sheet 36 during manufacture of the composite insulation, and should preferably be about 16-20 inches O.D. for convenience of handling. About 300-400 linear feet of composite insulation may be wound in a roll of such diameter.

The web layer is preferably slightly wider than the reflecting shield backing sheet so as to provide an overlap and prevent the possibility of contact between succeeding layers of the backing sheet. If the web material extends too far beyond the reflective shield backing sheet, the web layers tend to interleave with adjacent web layers and thus cause difficulty when the composite insulation is unwound from the composite roll 40 onto a container being insulated. For best results, the preferred overlap of the web material past the reflective sheet is ⅓ to 1 inch on each side. The insulation composite rolls 40 may be stored until needed, and transported to any desired location for wrapping onto container 41. They are preferably shipped and stored in a horizontal position to prevent the possibility of the layers "telescoping" upon themselves, which damages the composite insulation and impairs its usefulness.

Figure 5:
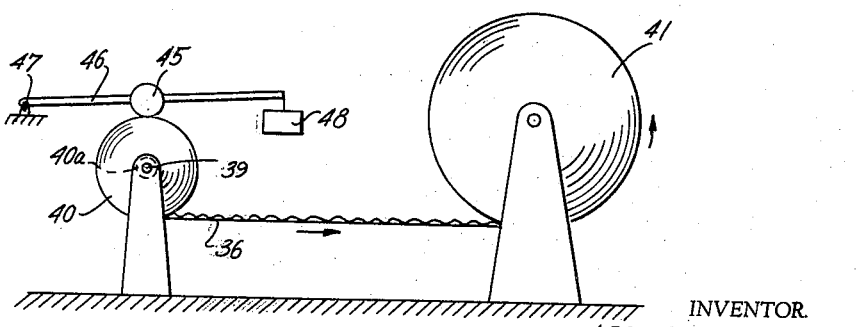
FIG. 5 is a schematic drawing taken in elevation, of apparatus suitable for wrapping the rolled insulation composite around a curved surface container.

At the point of application, the outer end of the rolled insulation composite is secured to the curved surface of container 41 in any suitable manner, as for example by an adhesive. Upon wrapping the insulation onto a container, the core 40a may also serve as a means of providing necessary tension to the insulation composite. Although the insulation composite is usually applied to a container with the radiation reflecting backing sheet on the outside, it may be desirable in some situations to wrap with the web outside. In this event, the web may for example be attached to the backing sheet with a suitable adhesive. The insulation composite roll is unwound and wrapped onto container 41 while tensioning the reflecting shield backing sheet 36 sufficiently to provide the desired number of sheet layers per cross-sectional inch thickness of the installed insulation. This may for example be accomplished by axially rotating container 41 using suitable driving and power means, and braking the reflecting shield backing sheet 36 being fed from roll 40. Thus, means are provided for varying the tension on the composite insulation roll as required to control the layers per inch applied to the container within a desired range. Also, greater tension is usually required when wrapping containers of larger diameter. This may be accomplished simply by applying torque to the supply roll shaft by any convenient means such as a variable torque brake, or alternatively by applying tension directly to the insulation backup sheet such as by a frictional drag or roller device, such as shown by FIG. 5. Also, if desired, the insulation may be applied over the top of the container rather than under it as shown.

Referring now more specifically to FIG. 5, tension is applied to composite insulation roll 40 by roller 45 on arm 46 attached at one end to pivot 47. The opposite end of arm 46 has weight 48 suspending therefrom. Weight 48 is adjustable so that any desired degree of tension may be transmitted to roll 40.

Figure 6:
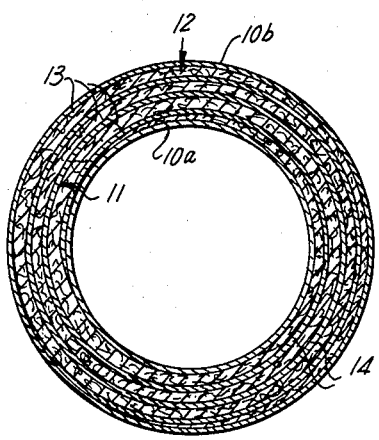
FIG. 6 is a sectional view taken along line 6—6 of FIG. 1, of the insulation.

The insulation composite may be wrapped around the curved surface of the container in any one of a variety of ways. However, the insulation composite is preferably spirally wrapped around the inner vessel in the FIG. 6 manner, with one end of the insulation wrapping in contact with the inner vessel 10a and the other end nearest the outer casing 10b or in actual contact therewith. The method of this invention may be used either to apply a single width roll or more than one roll simultaneously of composite insulation onto a curved surface container. Also, if it is necessary to stabilize the insulation on the container after application, a banding technique may be used.

It will be apparent from the foregoing discussion that important advantages of the instant method include elimination of the paper back-up sheets, a usually discarded packaging component, thereby reducing the total cost of materials. Also, means for removing the paper back-up sheet from the supply roll are no longer needed so that the insulation wrapping equipment is simpler and less costly. Another significant improvement over the prior art method is virtual elimination of the possibility of damage to the webs, as physical handling thereof is avoided. As previously discussed and illustrated, thinner and lighter weight webs may be manufactured and used. In view of the elimination of web damage and the feasibility of using thinner and lighter webs, the present invention facilitates the employment of insulation composites having improved thermal properties as shown by Table I.

Wrapping of the insulation composite around the container curved surface, according to this invention, is simpler, faster and less expensive, since it only involves a single feed transfer from the supply roll 40 to the container 41 being insulated (see FIG. 4). There is no problem of aligning the separate web and reflective shield rolls in prior art apparatus such as that illustrated in U.S. Patent No. 3,019,573 issued February 6, 1962 to C. R. Navikas. Sufficient tension may be provided by the radiation sheet back-up roll 37 to rotate the insulation composite supply roll 40, and also to control the density of wrapping if desired. Also since both the web and reflective shield components are incorporated into a single roll 40, the desired width of material for any particular insulation system may be readily obtained by cutting off one end of the roll as required, e.g. with a fine tooth saw.

Although preferred embodiments of the invention have been described in detail, it is to be understood that modifications and variations may be effected without departing from the spirit and scope of the invention. For example, the invention is equally suitable for the manufacture of insulated containers without closed ends, as for example conduits.

What is claimed is:
1. A method for manufacturing a structure comprising a container having an outer curved surface wrapped with alternate layers of thin, flexible radiant heat reflecting shields and elastically compressible fibrous web material, which method comprises the steps of:
  (1) forming an insulation composite of a thin, reflecting shield backing sheet and elastically compressible fibrous web material at least coextensive with and superimposed upon and continuously supported by said backing sheet;
  (2) winding said insulation composite into a roll; and
  (3) providing said container having an outer curved surface, and wrapping such container with said insulation composite by simultaneously unwinding said roll in such manner that said reflecting shield backing strip continuously supports said fibrous web material, tensioning the reflecting shield backing sheet, and applying the insulation composite on the curved surface of said container in such manner that said reflecting shield backing sheet continuously supports said fibrous web material.

2. A method according to claim 1 in which the reflecting shield backing sheet thickness is less than about 0.2 mm.
3. A method according to claim 1 in which aluminum foil is said thin, reflecting shield backing sheet.
4. A method according to claim 1 in which ¼ mil thick aluminum foil is said thin, reflecting shield backing sheet.
5. A method according to claim 1 in which loosely packed, unbonded glass fibers having an average weight of 1–10 grams per square foot constitute said elastically compressible fibrous web material.
6. A method according to claim 1 in which loosely packed, unbonded glass fibers having individual diameters of about 1.6 to 2.6 microns and an average weight of about 2.5 grams per square foot constitute said elastically compressible fibrous web material.

References Cited in the file of this patent
UNITED STATES PATENTS

| | | |
|---|---|---|
| 2,406,801 | Byers | Sept. 3, 1946 |
| 2,445,768 | Driver | July 27, 1948 |
| 2,793,572 | Parmele | May 28, 1957 |
| 2,897,874 | Stalego et al. | Aug. 4, 1959 |
| 3,009,601 | Matsch | Nov. 21, 1961 |
| 3,019,573 | Navikas | Feb. 6, 1962 |